Patented Nov. 21, 1939

2,180,725

UNITED STATES PATENT OFFICE 2,180,725

METHOD OF MAKING GOODS OF CELLULAR RUBBER

Albert Nelson Ward, Bordesley Green, Birmingham, and Frank Theodore Purkis, Moseley, Birmingham, England, assignors to Dunlop Rubber Company Limited, London, England, a British company No Drawing. Application November 8, 1937, Serial No. 173,456. In Great Britain December 21, 1936

7 Claims. (Cl. 260—723)

Our invention comprises improvements in or relating to the manufacture of goods of or containing sponge-like or cellular rubber or similar material of the kinds hereinafter specified.

Processes have heretofore been proposed for the manufacture of goods of rubber or similar material of sponge-like or cellular structure from aqueous dispersions of rubber or the like by converting the aforesaid dispersions in the presence of water-soluble soaps or soap-forming ingredients into a frothy condition wherein the froth comprises a gas and the emulsions or dispersions aforesaid are still in the reversible condition, and thereafter causing the frothy mass to set to a permanent structure of irreversible solid material.

In such processes, aqueous dispersions of rubber or the like can be employed which are or have been rendered capable of gelling on the application of heat, or to which substances have been added to cause the dispersions to gel in the cold after a definite and controllable time interval. The substances used for the gelling action must have little or no inhibiting or breaking down effect on the froth.

The substances usually added in this connection for use in conjunction with, for example, ammonium oleate, were sodium or potassium silico fluoride. However, for certain purposes, such as hot gelling in connection with spreading operations, where it is desirable to use a latex froth having as long an unchanged state in the cold as possible prior to hot gelling, it is found to be undesirable to use these substances, as they can only be used in small quantities, if it is to be ensured that little progressive thickening takes place in the cold, with the consequent formation of only weak gels, i. e., coagula easily deformable and of low tensile strength, on the subsequent application of heat. Sodium silico fluoride used in sufficient amounts readily produces strong gels on the application of heat but, as just stated, such larger additions lead to a progressive thickening of the latex in the cold. This being so, such latices are not so useful in spreading operations because the consistency of the latex passing under the spreading knife will become thicker and thicker with time.

Although it is known that the use as gelling agents of only small quantities of mixtures comprising an ammonium salt of a strong acid and an oxide of a metal of fixed bivalency of group II of the periodic system, for example, the oxides of calcium, magnesium and zinc as described in British Patent No. 292,964, gives strong gels on the application of heat to rubber latices containing such mixtures, nevertheless such mixtures have been found to lead to a breaking down of a latex foam structure, presumably because of the effect of the acidic nature of solutions of ammonium salts on the soaps present in the latex.

Our present invention provides a method which permits the employment of ammonium salts as gelling agents in connection with foamed rubber latices containing an oxide of a metal of fixed bivalency of group II of the periodic system.

According to the present invention the method for the production of goods of rubber or similar material of sponge-like or cellular structure from foamed aqueous dispersions of the kinds hereinafter specified containing an oxide of a metal of fixed bivalency of group II of the periodic system comprises bringing about the solidification of the aforesaid foamed aqueous dispersions in the presence of aqueous solutions of ammonium salts conditioned to have a pH value greater than 7.

Preferably the aforesaid conditioned aqueous solutions of ammonium salts are added to and uniformly distributed in the already foamed dispersions. Examples of such salts are ammonium sulphate, ammonium nitrate and ammonium acetate.

Usually it is found sufficient to make the aqueous solutions of the ammonium salts just alkaline to give an alkaline reaction with such an indicator as Bromo-Thymol Blue.

The present invention is particularly applicable to foamed latices containing froth-forming or lather-forming substances such as soap or soap forming ingredients.

When heat is employed to convert the foam or froth produced to a solid or sponge-like structure, the temperature should not be so high as to cause breakdown in the cell structure, for example, the temperature should not be above the boiling point of water.

The emulsions or dispersions comprise those consisting of or containing rubber, gutta-percha, balata or similar vegetable resins, occurring naturally or artificially obtained, and in vulcanized or unvulcanized condition. Aqueous dispersions of coagulated rubber, vulcanized rubber, synthetic rubber, waste or reclaim may also be employed, if desired, as alternatives or admixtures.

Any of the aforesaid dispersions may contain the usual known compounding ingredients. Concentrates such as are obtained in British Patents Nos. 290,313 and 219,635 to which may be added any one or more of the usual compounding ingredients, preferably excepting those which would tend to form insoluble soaps or to increase the surface tension of the foamy mass, may also be used.

What we claim is:

1. A method for the production of goods of rubber or similar material of sponge-like or cellular structure from foamed aqueous dispersions of the kinds hereinbefore specified containing an oxide of a metal of fixed bivalency of group II of the periodic system, which comprises adding to the aforesaid foamed aqueous dispersions an aqueous solution of ammonium salts normally having a pH value less than 7 and conditioned to have a pH value greater than 7.

2. A method as claimed in claim 1 wherein the ammonium salt is a member of the group consisting of ammonium sulphate, ammonium nitrate and ammonium acetate.

3. The method of claim 1 wherein the aqueous solutions of the ammonium salts are made just alkaline to give an alkaline reaction with Bromo-Thymol Blue.

4. The method of claim 1 wherein the foamed latices contain froth-forming or lather-forming substances such as soap or soap forming ingredients.

5. The method of claim 1 in which said aqueous solution of ammonium salts is conditioned by adding an alkaline reacting reagent sufficient to render the solution alkaline.

6. A process for the production of goods of cellular rubber from foamed aqueous dispersions thereof containing an oxide of a metal of fixed bivalency of group II of the periodic system, which comprises adding to the foamed aqueous dispersion an aqueous solution of ammonium acetate containing alkaline reacting reagents sufficient to give said solution a pH value above 7.

7. A process for the production of cellular rubber material from foamed aqueous dispersions thereof containing zinc oxide which comprises adding to said foamed dispersion a solution of ammonium acetate containing sufficient alkaline reacting reagents to give said solution a pH value above 7.

ALBERT NELSON WARD.
FRANK THEODORE PURKIS.